(No Model.)
J. WHITE.
BALL BEARING FOR VELOCIPEDES.
No. 300,544. Patented June 17, 1884.
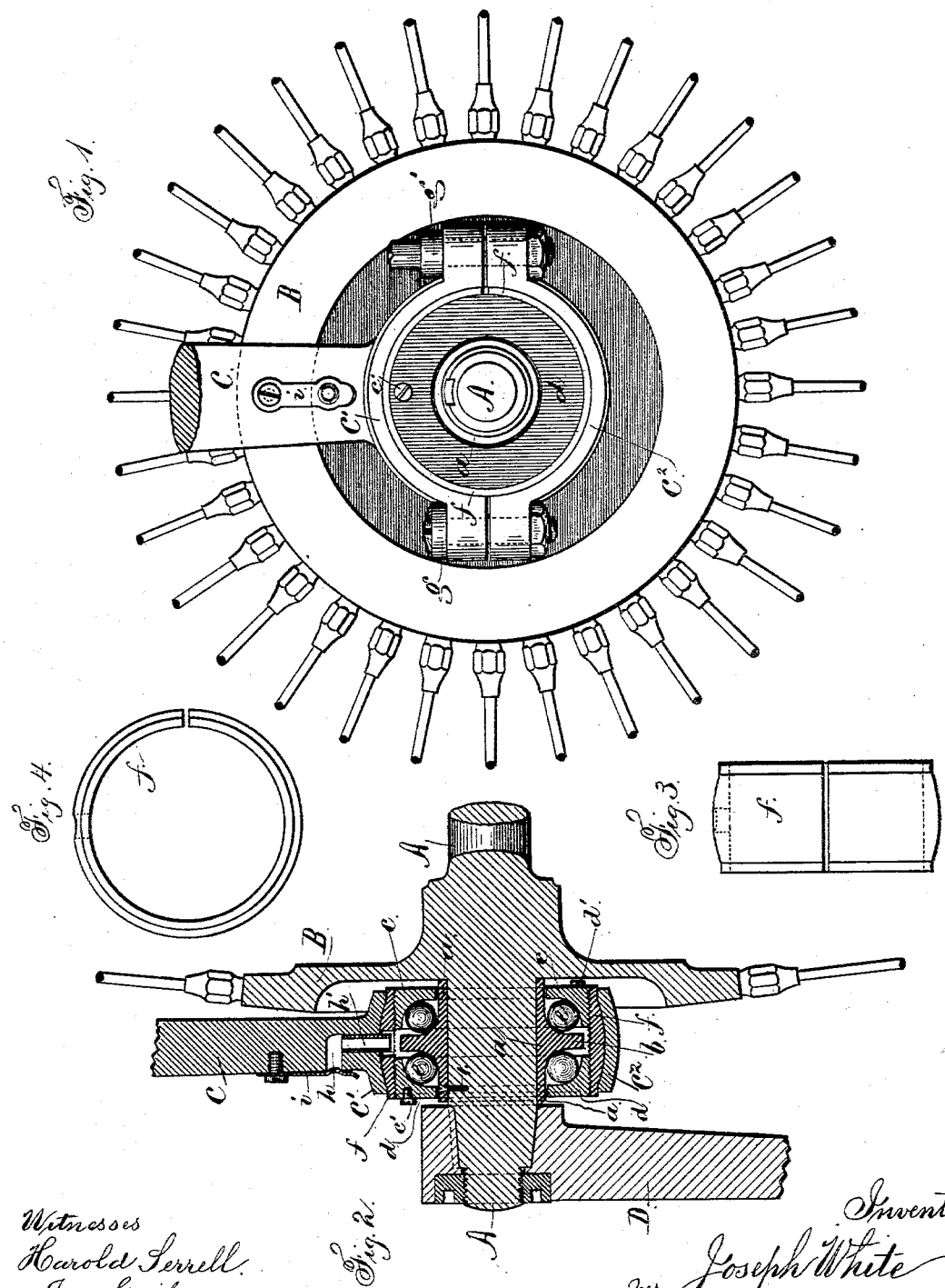
Witnesses
Harold Serrell.
J. Staib.
Inventor
per Joseph White
Lemuel W. Serrell att'y

UNITED STATES PATENT OFFICE.

JOSEPH WHITE, OF COVENTRY, ENGLAND.

BALL-BEARING FOR VELOCIPEDES.

SPECIFICATION forming part of Letters Patent No. 300,544, dated June 17, 1884.

Application filed February 18, 1884. (No model.)

*To all whom it may concern:*

Be it known that I, JOSEPH WHITE, of Coventry, England, have invented certain new and useful Improvements in Ball-Bearings for the Wheels of Bicycles, Tricycles, &c.; and the following is declared to be a description of the same.

The wheels of bicycles, tricycles, &c., are provided with ball-bearings both of the single and double type. The bearings as heretofore made are difficult to adjust in their housings, and the adjustment of the bearing-surfaces to take up wear has also proved difficult, and much annoyance, inconvenience, and loss of time and money have resulted therefrom.

My invention relates to bearings both of the double and single ball type wherein there is a double or a single ring of anti-friction balls in each bearing-box. My improved bearing is equally applicable to all the wheel-axles of bicycles, tricycles, and quadricycles. When made double, my improved bearing consists of the following parts, viz: a collar upon the axle having a central rib or flange, the opposite sides of said rib or flange forming one of the bearing-surfaces for each set of balls, two side ring-bearings having screw-threaded circumferences, each ring forming a bearing-surface for one set of anti-friction balls, and a split ring the interior surface of which is screw-threaded to receive the two ring-bearings. The exterior surface of this split ring is segment-shaped in cross-section, for the purpose hereinafter described. The bearing is embraced by two yokes which serve to connect it to the fork of the bicycle, one yoke being made solid with the fork and connected to the separate yoke by screw-bolts. I prefer to employ an oil-hole at the lower end of the fork, and opening into the bearing to lubricate the same.

In the drawings, Figure 1 is a side view of my improved bearing as applied to a bicycle-fork. Fig. 2 is a vertical section of the same. Fig. 3 is a side view of the split collar, and Fig. 4 is an edge view of the same.

A is the axle.

B represents a portion of the bicycle-wheel, and C is a portion of one of the prongs of the fork, terminating in the yokes $C'$ $C^2$, and D shows a portion of one crank upon the axle A. The circular collar $a$ surrounds and closely fits the axle A, and is by preference secured and kept from coming off or turning by a screw or pin, 1, and said collar $a$ is made with a central rib or flange, $b$.

$c$ and $d$ are ring-bearings, curved in cross-section on their inner faces to bear against the anti-friction balls $e$, and they are screw-threaded on their external periphery. These ring-bearings screw into a split ring, $f$, and form therewith a box for containing the anti-friction balls $e$. The ring-bearings $c$ and $d$ are furnished with projecting pins $c'$ $d'$, by which to turn the rings around and adjust them to the anti-friction balls. The central opening in these ring-bearings is slightly larger than the circumference of the collar $a$. The interior of the split ring $f$ is screw-threaded to receive the ring-bearings $c$ $d$, and its segment-shaped exterior fits into a corresponding annular recess formed in the yokes $C'$ $C^2$. When these yokes are secured together, as shown in the drawings, the split ring $f$ will be held firmly in place; but before the coupling screw-bolts $g$ $g'$ are tightened up the split ring $f$—or, rather, the bearing of which it forms the external portion—will be free to adjust itself in its yokes, and thereby all tendency to torsion of the axle or strain of the bearings will be avoided. By thus providing for the adjustment of the bearings in their yokes, the necessity will be avoided for providing a knuckle-joint in the prongs of the fork, the introduction of which has been a source of weakness in bicycles. Similarly, the use of this plan of housing the ball-bearings of tricycles will be advantageous, as it provides for the self-adjustment of the axles of the traveling wheels with respect to the framing of the carriage. Before tightening up the housings I have said that the ring $f$ is split. It is, however, sufficiently stiff to retain the inserted ring-bearings $c$ $d$ in place. When, however, they have been adjusted to suit the anti-friction balls, the tightening up of the housing or yokes by means of the bolts $g$ $g'$, which are passed through the lugs of the yokes, will secure the yokes together, and will cause the split ring $f$ to firmly grip the ring-bearings $c d$ and prevent them from turning or working loose. The bolt $g$ is made with a screw-head and the bolt $g'$ with a square head for a wrench or key. The yoke $C'$ is made solid with the prong of the fork of the bicycle, and thus insures rigidity to the machine. The double rings or sets of balls $e$ bear on one side against the junction of the flange $b$ with the collar $a$, and on the other side against the curved interior of the ring-bearings $c\ d$, respectively. In running the machine this collar $a$ rotates with the wheel-axle, while the ring-bearings $c\ d$, being gripped by the split ring $f$ and yokes $C'$ $C^2$ remain stationary. To adjust this bearing, if worn, it is only necessary to loosen the key-bolt $g'$, and thereby free the ring-bearings from the grip of the split ring $f$. A slight turn of these ring-bearings will cause them to approach the central flange, $b$, and thereby take up the wear of the friction-surfaces. When thus adjusted, the tightening of the key-bolt $g'$ will cause the split ring $f$ to grip the ring-bearings $c\ d$ and hold them firmly in place, as before. I provide an oil-hole, $h$, in the fork, and an oil-tube, $h'$, leading from this hole down through the fork and yoke into an opening made through the split ring $f$, giving free access for oil to the bearing, and a spring dust-cap, $i$, is provided to cover the oil-hole $h$.

From the foregoing it will be obvious that a single-ball bearing will not require a bearing-flange, $b$, on the collar $a$, the two ring-bearings $c\ d$ in that case serving to take the opposite sides of the anti-friction balls.

I claim as my invention—

In a ball-bearing for wheels, whether containing one or two sets of balls, a box composed of a split ring, $f$, and threaded internally to receive adjustable side ring-bearings, $c\ d$, having curved bearing-surfaces for the balls, such split ring being segment-shaped in cross-section and fitting a corresponding annular recess in yokes which are capable of being tightened up, all substantially as and for the purpose above described.

January 24, 1884.

JOSEPH WHITE.

Witnesses:
WILSON KING,
*Consul of the United States, Birmingham.*
J. M. DICKINSON.